(12) United States Patent
Pace et al.

(10) Patent No.: US 6,491,750 B1
(45) Date of Patent: Dec. 10, 2002

(54) PAINT COLORANT PRODUCT AND METHOD

(75) Inventors: James P. Pace, Mira Loma, CA (US); Mary Rice, Laguna Niguel, CA (US)

(73) Assignee: Behr Process Corporation, Santa Ana, CA (US)

( * ) Notice: Subject to any disclaimer, the term of this patent is extended or adjusted under 35 U.S.C. 154(b) by 0 days.

(21) Appl. No.: 09/538,658

(22) Filed: Mar. 30, 2000

(51) Int. Cl.$^7$ .............................. C09C 1/24; C09C 1/48
(52) U.S. Cl. ...................... 106/456; 106/401; 106/474
(58) Field of Search ................ 106/401, 456, 106/474

(56) References Cited

U.S. PATENT DOCUMENTS

| | | |
|---|---|---|
| 924,322 A | 6/1909 | Crosby |
| 1,125,078 A | 1/1915 | Dunn |
| 1,351,661 A | 8/1920 | Kaufman |
| 1,483,529 A | 2/1924 | Tanner |
| 1,515,512 A | 11/1924 | Mitchell |
| 1,529,125 A | 3/1925 | Goodwin |
| 1,593,113 A | 7/1926 | Winsche |
| 1,762,036 A | 6/1930 | Steedle |
| 1,764,083 A | 6/1930 | Miskella |
| 1,824,598 A | 9/1931 | Holder |
| 2,988,824 A | 6/1961 | Morton |
| 3,751,829 A | 8/1973 | Foss |
| 4,104,809 A | 8/1978 | Day et al. |
| 4,112,594 A | 9/1978 | Impastato |
| 4,211,016 A | 7/1980 | Eldar |
| 4,665,394 A | 5/1987 | Coles et al. |
| 4,796,888 A | 1/1989 | Louez |
| 4,801,267 A | 1/1989 | Von Loesch et al. |
| 4,911,642 A | 3/1990 | Knowles |
| 4,992,050 A | 2/1991 | Edwards |
| 4,998,882 A | 3/1991 | Glover |
| 5,026,286 A | 6/1991 | Hellwig |
| 5,033,963 A | 7/1991 | Bourges |
| 5,123,745 A | 6/1992 | Augur |
| 5,174,758 A | 12/1992 | Abramson |
| 5,275,566 A | 1/1994 | Yang |
| 5,738,716 A * | 4/1998 | Santilli et al. ............. 106/31.6 |
| 5,842,866 A | 12/1998 | Chow |
| 6,080,209 A * | 6/2000 | Wiesenfeldt et al. .......... 8/436 |

FOREIGN PATENT DOCUMENTS

| | | |
|---|---|---|
| CA | 769859 | 10/1967 |
| DE | 1 218 321 | 6/1966 |
| FR | 1453237 | 9/1966 |

OTHER PUBLICATIONS

Journal of Information Display, vol. 11, No. 6 (6/75). Hendrickson, Herbert C. "Positional Color Coding–A Color Identification System that Combines Color and Intensity." pp. 22–25.

* cited by examiner

Primary Examiner—Anthony J. Green
(74) Attorney, Agent, or Firm—Knobbe, Martens, Olson & Bear LLP

(57) ABSTRACT

A neutral paint colorant has a composition comprising approximately 7.0% Color Index Pigment Yellow 42, 2.4% Color Index Pigment Red 101, and 4.0% Color Index Pigment Black 7. A pre-blended mixture of the neutral colorant and a paint base can be blended with a first paint to form a second paint having substantially the same hue and value (lightness) as the first paint, but a lower chroma (brightness).

4 Claims, 3 Drawing Sheets

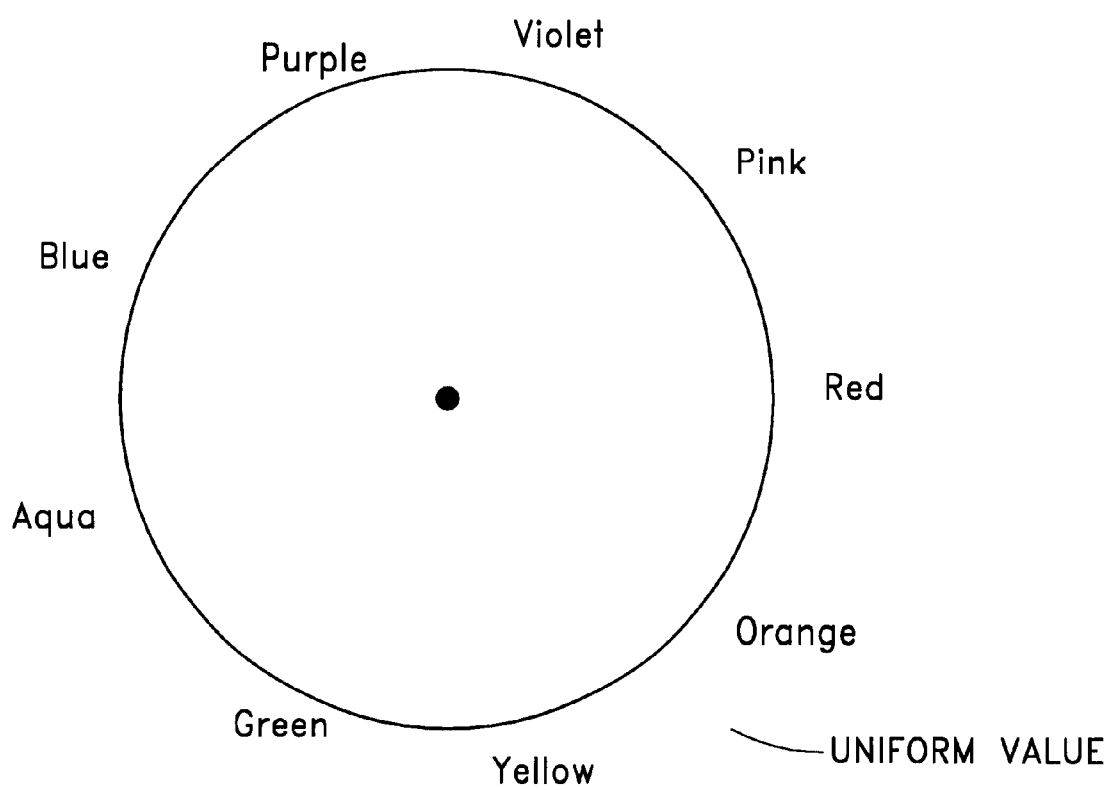

PAINT COLORANT PRODUCT AND METHOD

BACKGROUND

1. Field

The present invention relates generally to architectural paints and, in particular, to architectural paint colorants.

2. Description of the Related Art

Architectural paint ("house paint") is commonly provided in various colors. Paint color groups have been developed to provide a selection of architectural paint colors to consumers.

Paint colors are sometimes referenced with respect to systems for arranging and describing color, generally referred to as color-order systems. One well-known color-order system is the Munsell system. According to the Munsell system, all possible colors are characterized by three attributes: hue, value, and chroma. Hue is the attribute of color which is commonly described by words such as "red," "yellow," "green," "blue," "purple," etc. Value is the attribute of color which is described by the words "light," "dark," etc. Chroma is the attribute of color which is described by the words "bright," "dull," etc. For example, the colors of a tomato and a brick may be equal in hue and value, yet the colors are not identical. The difference is that the tomato is brighter, having a higher chroma.

Munsell color space is a three-dimensional space including and describing visual relationships between colors. This color space is based on a collection of actual physical samples arranged so that adjacent samples represent distinct intervals of visual color perception. Although based on physical samples, Munsell color space is theoretically capable of describing all possible colors. According to the Munsell system, color space is described with respect to three dimensions: hue, value, and chroma. Theoretically, the Munsell location of every possible color can be described by three coordinates, corresponding to the hue, value, and chroma of the given color. Although in theory Munsell color space is capable of describing all colors, it is understood that it may not be possible to create physical samples of all of the colors which could theoretically fit within Munsell color space. In particular, not all theoretical colors within the perceived Munsell color space can be made into paints.

Within Munsell color space, a vertical axis, known as the value axis, represents color value. In other words, the value (lightness/darkness) of color is determined by the vertical position within color space. Color becomes lighter as the vertical position increases. The hue of color is determined by the angular position about the vertical value axis. The various hues, i.e., shades of red, yellow, green, blue, purple, etc., are represented by vertical planes extending radially from the value axis. Moreover, every angular position about the axis, from 0° to 360°, represents a different hue. The chroma (brightness/dullness) of color is determined by the radial distance from the value axis. Color is dull (gray) near the axis and becomes brighter, or more "chromatic," as the radial distance from the value axis increases.

The Munsell system is one of a number of color-order systems based on actual physical samples. Another class of color-order systems are not based on physical samples. One of the most important of these systems is the CIE System (Commission International de l'Eclairage or International Commission on Illumination). The premise of the CIE System is that the stimulus for color is provided by a proper combination of a source of light, an object, and an observer. The CIE System describes color with reference to a standard source of illumination and a standard observer.

One widely used non-linear transformation of the CIE System is CIELAB, an opponent-type space in which color is described by the three coordinates L, a, and b. In CIELAB space, L is the lightness of color (similar to Munsell value), a is a redness-greenness coordinate, and b is a yellowness-blueness coordinate. Several color-order systems exist within CIELAB space. One such color-order system is D65 CIELAB.

Paints of various colors are generally formed by mixing one or more liquid paint colorants with a paint base. Paint color can be varied by using a different combination of paint colorants, or by changing the concentration of one or more of the colorants in the paint. Paint colorants are formed by blending one or more pigments into what the industry refers to as a "grinding liquid," a liquid grinding medium. The coloring power of a paint colorant can be varied by changing the pigment concentrations of the constituent pigments in the colorant.

Existing methods for producing paints for customers at a retail site commonly utilize a mixing device having a plurality of spouts, each adapted to eject one or more drops of a particular paint colorant into a paint base. Accordingly, a customer may select a desired quantity of paint having a desired paint color. The desired paint color has known ratios of various paint colorants to a paint base. Typically, a paint technician will operate the mixing device so as to mix the various quantities of the constituent paint colorants with a quantity of the paint base to produce the desired quantity of the selected paint color. A limitation of this method is that it may be difficult to accurately produce the selected paint color. The smallest quantity of any colorant that the mixing device can eject is a drop of about 1/96 of an ounce. Some mixing devices are limited to drops of 1/48 of an ounce. Thus, the amount of any given constituent colorant in the produced paint will be a multiple of drops. However, it may be desirable to blend an amount of a particular colorant which is not exactly equal to a multiple of drops. This "one-drop" limitation of the mixing device causes some inherent imprecision in the mixing of colorants, which may result in the produced paint having a color which is slightly different than that which was selected by the customer.

SUMMARY

Accordingly, it is a principle object and advantage of the present invention to overcome some or all of these limitations and to provide a specialized paint colorant facilitating the accurate production of paint colors throughout a given architectural paint color space.

The present invention provides a "neutral paint colorant" to aid in the development of paint colors throughout color space. In particular, the neutral paint colorant, or simply neutral colorant, may be added to a paint to decrease the paint's chroma while maintaining its hue substantially constant. Advantageously, the neutral colorant may be added to highly chromatic colors to develop duller colors that may be more suitable for some purposes. This is especially useful in the architectural paint environment in which duller, less chromatic colors are used more often than brighter, more chromatic colors.

One may readily determine the colorant compositions of the architectural paint colors developed with the aid of the neutral colorant of the invention. Each paint color comprises a mixture of prime colorants, neutral colorant, and paint base. The ratios of each of these constituents to the whole mixture are determined as described below. The colorant compositions of various paint colors may be recorded in a storage medium for use at a retail site. Advantageously, a system is implemented which permits a consumer to select a paint color and then retrieves the composition of the selected paint color. The composition may be fed to an automated paint production apparatus or may be transmitted to a paint technician who will produce the selected paint color.

In one aspect, the present invention provides a method of forming a neutral paint colorant, comprising the following steps: A first colorant is blended with a paint base to form a paint having a chroma substantially equal to zero. A quantity of one of the first colorant or the paint base is added to the paint, to vary the value of the paint. The chroma of the paint is then measured. If the chroma of the paint is not substantially equal to zero, one or more offsetting colorants are added to the paint to reduce the chroma of the paint so that it is substantially equal to zero. The neutral paint colorant comprises a mixture of the first colorant and the offsetting colorants. The composition of the neutral colorant is determined by the relative amounts of the first colorant and the offsetting colorants which are in the paint.

In another aspect, the present invention provides a paint colorant comprising a mixture of pigments blended with a grinding liquid. The colorant is configured to be added to a first paint to form a second paint, wherein the chroma of the second paint is less than the chroma of the first paint, and the hue of the second paint is substantially the same as the hue of the first paint.

In another aspect, the present invention provides a paint colorant comprising a mixture of pigments blended with a grinding liquid. The colorant is configured to be added to a first paint base to form a first paint. The first paint has the property that when the first paint is added to a second paint made from the same paint base as the first paint, a third paint is formed, wherein the chroma of the third paint is less than the chroma of the second paint, and the hue and value of the third paint are substantially the same as the hue and value of the second paint. Advantageously, the "component ratios" of the various constituent colorants to the base in the third paint can be readily determined from the quantities of such colorants and the base in the first and second paints. Such component ratios may then be used subsequently to recreate the paint color of the third paint.

In another aspect, the present invention provides a method of producing a paint, comprising the steps of blending a mixture of pigments with a grinding liquid to form a neutral paint colorant, adding the neutral paint colorant to a first paint base to form a first paint, and adding a volume of the first paint to a volume of a second paint to form a third paint. The neutral paint colorant has the property such that the chroma of the third paint is less than the chroma of the second paint, and the hue of the third paint is substantially equal to the hue of the second paint. Further, the addition of the neutral paint colorant to the first paint base may be controlled so that the first paint has a value substantially equal to the value of the second paint.

In another aspect, the present invention provides a paint colorant comprising 6.3% to 7.7% Color Index Pigment Yellow 42, 2.16% to 2.64% Color Index Pigment Red 101, and 3.6% to 4.4% Color Index Pigment Black 7. In a narrower aspect, the paint colorant comprises 7.0% Color Index Pigment Yellow 42, 2.4% Color Index Pigment Red 101, and 4.0% Color Index Pigment Black 7. The remainder of the paint colorant comprises components other than pigments, such as a grinding liquid.

In another aspect, the present invention provides a method of producing a neutral paint colorant, comprising the steps of blending Color Index Pigment Yellow 42, Color Index Pigment Red 101, and Color Index Pigment Black 7 together to form a pigment mixture, and blending the pigment mixture into a grinding liquid to form a paint colorant. The paint colorant has a composition of 6.3%–7.7% Color Index Pigment Yellow 42, 2.16%–2.64% Color Index Pigment Red 101, and 3.6%–4.4% Color Index Pigment Black 7.

In another aspect, the present invention provides a method of creating a paint, comprising the steps of selecting a source paint comprising a mixture of paint colorants with a first paint base, blending a neutral paint colorant with a second paint base to form a neutral paint, and blending the neutral paint with the source paint to form an output paint. The neutral colorant comprises 6.3% to 7.7% Color Index Pigment Yellow 42, 2.16% to 2.64% Color Index Pigment Red 101, and 3.6% to 4.4% Color Index Pigment Black 7. The first and second paint bases are identical. The hue and value of the created output paint are substantially equal to the hue and value of the source paint, and the chroma of the created output paint is less than the chroma of the source paint.

In another aspect, the present invention provides a device for blending paint colorants with a paint base to create an architectural paint having a desired hue, value, and chroma. The device comprises a plurality of spouts adapted to eject a paint colorant, wherein one of the spouts is adapted to eject a neutral paint colorant. In one embodiment, the neutral paint colorant comprises 6.3% to 7.7% Color Index Pigment Yellow 42, 2.16% to 2.64% Color Index Pigment Red 101, and 3.6% to 4.4% Color Index Pigment Black 7.

All of these embodiments are intended to be within the scope of the invention herein disclosed. These and other embodiments of the present invention will become readily apparent to those skilled in the art from the following detailed description having reference to the attached figures, the invention not being limited to any particular embodiment(s) disclosed.

BRIEF DESCRIPTION OF THE DRAWINGS

FIG. 3 is a horizontal, i.e., uniform value, cross-sectional view of the theoretical color space of FIG. 1;

DETAILED DESCRIPTION

In general, any of a variety of color languages may be used to describe color. These languages have been developed to describe qualities which are visually perceived. The teachings and claims of this invention are directed toward that which is visually perceived, which may be described by the use of any color language. Although the invention is described with reference to a particular color language system described below, the invention is not intended to be limited to that context. In other words, it is contemplated that other color language systems could also be used to describe the present invention.

The present invention recognizes that it is useful to describe architectural paint colors with reference to hue, value, and chroma as contemplated by a theoretical color system. To describe the invention, it will be helpful to provide a context for the discussion of color, including a three-dimensional color space model.

Figure 1:
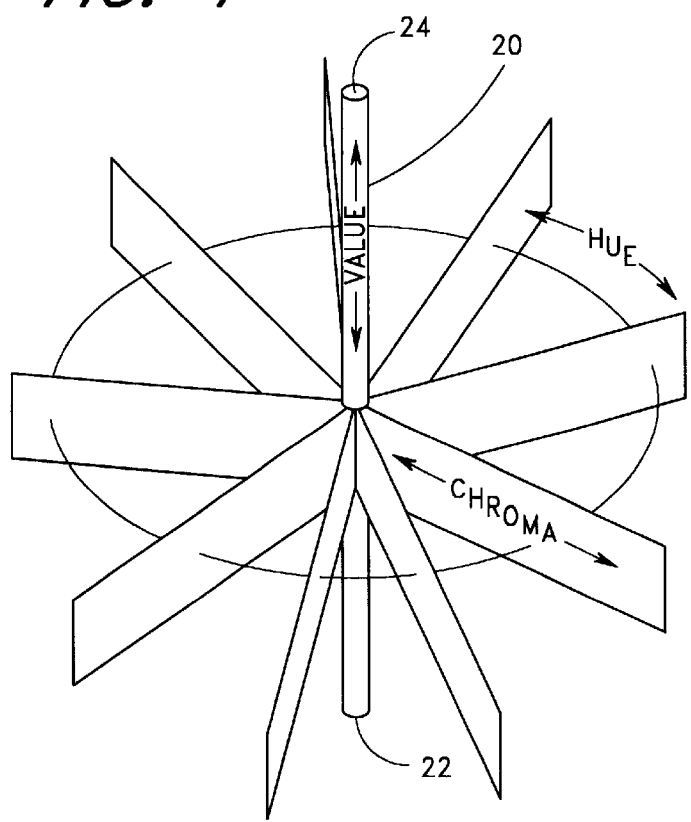
FIG. 1 is a graphical illustration of a theoretical color space.

An appropriate theoretical three-dimensional color space is graphically illustrated in FIG. 1. A vertical value axis 20 is shown. The value of color, i.e., the lightness or darkness of color, is determined by the vertical position within the color space. Color becomes lighter as the vertical position increases. The hue of color, i.e., the quality of color which is described by the words "red," "yellow," etc., is determined by the angular position about value axis 20. The chroma, i.e., brightness, of color is determined by the radial distance from value axis 20. Chroma is equal to 0 at the value axis 20. The color space is described below with respect to each of the individual dimensions value, hue, and chroma.

Figure 2:
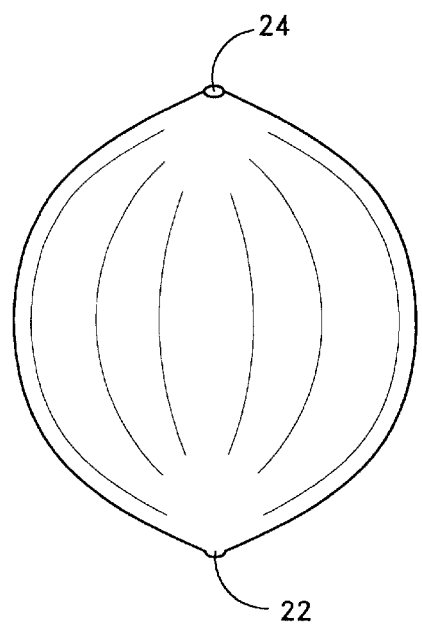
FIG. 2 is a perspective view of the theoretical color space of FIG. 1.

According to the system, color has a finite value (lightness) range. Thus, as shown in FIG. 1, value axis 20 has a finite length. By definition, the minimum value of color is 0, represented at the bottom point 22 of value axis 20, and the maximum value of color is 100, represented at the top point 24 of value axis 20. Value axis 20 represents varying lightness shades of gray, with the darker grays being nearer to the bottom of the axis and the lighter grays being nearer to the top. The bottom point 22 of value axis 20 has zero lightness and corresponds to pure black, the darkest color. Moreover, only pure black has a value equal to 0. Thus, the color space converges at point 22 of value axis 20. The top point 24 of value axis 20 has maximum lightness and corresponds to pure white, the lightest color. Moreover, only pure white has a value equal to 100. Thus, the color space converges at point 24 of value axis 20. Due to the convergence of the color space at the endpoints 22, 24 of value axis 20, the color space has a cocoon-like shape, as shown in FIG. 2.

According to the system, color also has a finite hue range. Color hue is limited to the angular positions spanning 0° to 360° about value axis 20. As the angular position about the axis changes, color transitions through a fixed sequence of hues. FIG. 3 shows a horizontal cross-section of the color space, intersecting value axis 20 between the endpoints 22 and 24 shown in FIG. 1. In other words, FIG. 3 shows a plane within the color space, having a uniform value between 0 and 100. As shown in FIG. 3, in the counter-clockwise direction about the value axis, hue transitions through the following generalized sequence: red, pink, violet, indigo, purple, blue, aqua, green, yellow, and orange. Of course, the colors indicated in FIG. 3 will be lighter or darker for different values between 0 (point 22) and 100 (point 24).

In addition to indicating variations in hue, the planar cross-section of theoretical color space represented by FIG. 3 also illustrates chromatic variations in the space. Color becomes brighter as the distance from the value axis 20 increases. Positions far from the value axis are very bright, or chromatic, while positions near the value axis are dull and more grayish. In theory, there is no limit to the possible chroma (brightness) of color having any given hue. However, in practice, color has a limited range of chroma, due to the fact that colors having chroma beyond a certain limit have not been discovered. In particular, for any given value and hue, color has a limited known chroma range. The word "known" is used to indicate that, for a given hue and value, higher chroma are not known to exist. The known chroma range is from 0 at the value axis 20 to an outer radial limit. The outer radial limit of the known chroma range varies for different values and hues. For example, a light yellow has a greater maximum known chroma than does a darker yellow. A dark red has a different maximum known chroma than does a light blue.

Figure 4:
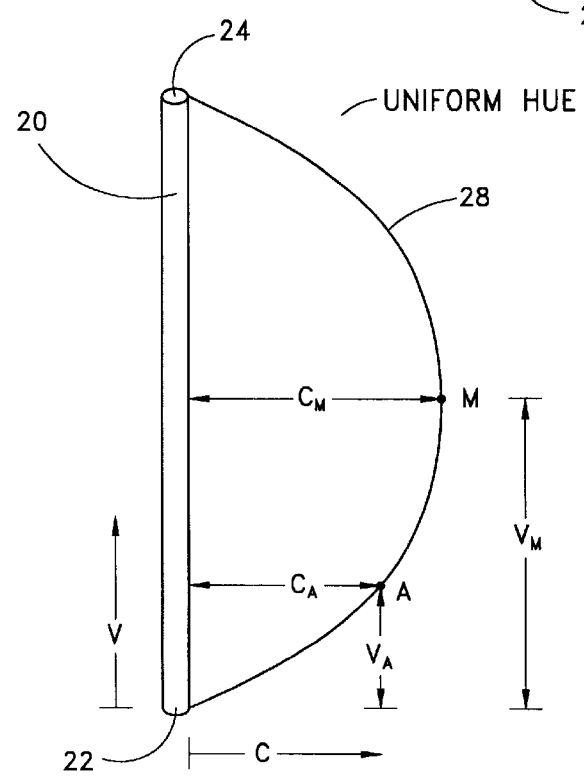
FIG. 4 is a uniform hue plane of the theoretical color space of FIG. 1.

FIG. 4 illustrates the varying known chroma range of color in the theoretical color space. FIG. 4 shows a uniform hue plane of the space, i.e., a "slice" of color space corresponding to a single hue. In particular, a vertical plane is shown passing through the value axis 20 and extending radially outward therefrom. This is essentially a known chroma range profile for a given hue. The profile shown in FIG. 4 is typical of most hues within the color space. As shown, the uniform hue plane has a straight edge, corresponding to the value axis 20, and a curved edge 28 corresponding to the highest known chroma for any given value. For example, consider a point A on the curved edge 28. Point A has a value $V_A$ and a chroma $C_A$. Thus, at the value $V_A$, the highest known chroma within the displayed hue plane of the space is $C_A$. Within the uniform hue plane, the known chroma range varies with value. At the bottom of the value axis, the known chroma range converges at the point 22. As the value increases, the known chroma range becomes larger. The maximum known chroma range within the displayed hue plane is at the value $V_M$, at which the known chroma ranges from zero at the value axis to $C_M$ on the line 28. The point M corresponds to the brightest color having the hue of the uniform hue plane. As the value increases above $V_M$, the known chroma range decreases. At the top of the value axis, the known chroma range converges at the point 24. It is understood that in practice it may not be possible to create all of the more chromatic colors of a given hue, particularly for architectural paints.

The present invention provides a "neutral paint colorant," or "neutral colorant," which may be used, as described below, to decrease a paint's chroma while maintaining the paint's hue substantially constant. In a narrower aspect, the neutral paint colorant may be used to decrease a paint's chroma while maintaining the paint's hue and value substantially constant. The term "neutral" indicates that the neutral colorant is achromatic, i.e., has a chroma approximately equal to zero. This means that the color is on or near the value axis 20. Moreover, when the neutral colorant is added to a paint base, the resulting paint is also achromatic. The value of the resulting paint depends on the concentration of the neutral colorant therein. As the concentration of neutral colorant decreases, the value increases (assuming the paint base is white).

The neutral colorant is preferably formed according to the following process: Initially, a first paint colorant is chosen, which when blended with a particular quantity of a paint base forms a paint having substantially zero chroma. Preferably, the chroma is preferably less than 0.15, more preferably less than 0.1, and even more preferably less than 0.05. The chroma may change as the value of the output paint color changes, i.e., as the relative proportions of base and first colorant are varied. A suitable paint colorant to begin with is black, especially "lamp-black," because it has a very low chroma. Hereinafter, the term "colorant" is understood to mean a mixture of a pigment with a grinding liquid. Black also has a low value. The value may be gradually increased by adding incremental quantities of a white paint base. Alternatively, the value may be decreased by adding incremental quantities of more black colorant.

After choosing a first paint colorant, it is blended with a paint base so that it has a first value at which chroma is substantially zero, as mentioned above. The value is then varied by adding one of a quantity of paint base or more of the first paint colorant, to form a different output paint color. Suppose the value is varied to a second value. The chroma of the output paint color is measured. If the chroma is substantially zero, the first colorant has maintained its neutrality along the value range defined between the first and second values. If the chroma is not substantially zero, the color has shifted from the value axis 20. For example, the color of lamp-black colorant may shift to a slightly chromatic blue. This color shift is caused by the fact that lamp-black colorant has some blue in it. The color shift can be compensated by the addition of one or more offsetting colorants. In the example given, the shift toward blue may be compensated by adding different quantities of, for example, red and yellow colorants, so that the color shifts back to the value axis 20. The targeted neutral colorant will ultimately be a combination of the first colorant and the offsetting colorants which are added to compensate for such color shifts. Thus, the composition of the neutral colorant of the invention evolves with the addition of the first and the offsetting colorants, the composition being the proportionate amounts of the constituent colorants.

The process is then repeated. Another quantity of one of the base or the first colorant is added to the paint so that it has a third value. The chroma is again measured. If the chroma is zero, the evolving neutral colorant has maintained its neutrality across the value range defined by the highest and lowest of the first, second, and third values. If the chroma is not zero, offsetting colorants are again added as above to compensate for the color shift. Optionally, the same offsetting colorants as before are used, so that the final composition of the neutral colorant has a small number of constituent colorants. The process is then repeated again. In this manner, the composition of the neutral colorant is repeatedly adjusted for a multitude of values (steps) across a desired overall value range, defined as the value range between the highest and lowest values at which the composition of the neutral colorant is adjusted as described above. The process preferably includes at least three steps. As more steps are taken, the composition of the neutral colorant evolves to more precisely maintain neutrality across the overall value range. At each step, offsetting colorants are added if the chroma of the paint is greater than a desired tolerance. The desired tolerance is preferably 0.15, more preferably 0.1, and even more preferably 0.05.

The above-described process results in a neutral colorant that maintains its neutrality across a desired overall value range. The combination of constituent colorants which comprise the neutral colorant may be chosen arbitrarily, but should have the effect of compensating any shifts in color caused by changes in the value of the paint color. Each step in the process may require a different adjustment of the constituent colorants, as compared to previous steps. For example, the color shift of the evolving neutral colorant may be greater at higher values than at lower values, requiring more of the offsetting colorants to be added. In addition, it may be necessary to add a greater quantity of one or more of the offsetting colorants to compensate for a color shift. After a suitable number of steps have been taken to arrive at a particular composition of the neutral colorant, the neutral colorant is preferably tested again throughout the entire color range.

As mentioned, the neutral colorant comprises a mixture of the first colorant and the offsetting colorants. The composition of the neutral colorant is determined by the relative amounts of the first colorant and the offsetting colorants which are in the paint. The composition of the neutral colorant may be expressed by the mass ratios of each of the constituent colorants to the total mass of the mixture of colorants. The ratio of the first colorant to the total mixture is equal to the total amount of the first colorant in the paint divided by the total amount of the first colorant and the offsetting colorants in the paint. The ratio of each of the offsetting colorants to the total mixture is equal to the total amount of the individual offsetting colorant in the paint divided by the total amount of the first colorant and the offsetting colorants in the paint.

The above-described process has been conducted beginning with a colorant comprising Color Index Pigment Black 7. As quantities of paint base are incrementally added to this colorant, the paint color shifts toward blue. Suitable first and second offsetting colorants comprise Color Index Pigment Yellow 42 and Color Index Pigment Red 101. Thus, according to one embodiment, the composition of the neutral colorant is, by mass, 6.3% to 7.7% Color Index Pigment Yellow 42, 2.16% to 2.64% Color Index Pigment Red 101, and 3.6% to 4.4% Color Index Pigment Black 7. These pigments are well-known in the art and are available in powder form. The remainder of the neutral colorant is a grinding liquid. Preferably, the neutral colorant has a composition comprising approximately, by mass, 7.0% Color Index Pigment Yellow 42, 2.4% Color Index Pigment Red 101, and 4.0% Color Index Pigment Black 7. Such a neutral colorant has been found to maintain its neutrality (approximately zero chroma) across a lightness range of approximately 50–95.

The above-described embodiment of the neutral colorant may be formed by first blending the above-mentioned pigments together, before adding them to a grinding liquid. In order to achieve the above-mentioned ratio of pigments in the liquid colorant, the powder form pigments may be blended in the following approximate ratio, by mass: 52.239% Color Index Pigment Yellow 42, 17.910% Color Index Pigment Red 101, and 29.851% Color Index Pigment Black 7. These percentages may be varied somewhat without straying from the scope of the invention. Then, the mixture of pigments is added to a volume of a grinding liquid to produce the neutral colorant. The volume of the grinding liquid is preferably such that the percentage masses of the individual pigments in the liquid colorant are approximately as listed above. Thus, the amount of grinding liquid is preferably such that the percentage mass of Color Index Pigment Yellow 42 is approximately 7.0%, the percentage mass of Color Index Pigment Red 101 is approximately 2.4%, and the percentage mass of Color Index Pigment Black 7 is approximately 4.0%.

A suitable grinding liquid for the purposes of the invention is a mixture of water, glycol, acrylic resin, and dispersants, i.e., wetting agents. Once the pigments are suspended in the grinding liquid, a sand mill may be used to finely blend the colorant. Afterwards a versator may be used to remove any air bubbles in the colorant. The use of sand mills and versators is well known in the art.

According to a method described below, the neutral colorant of the invention may be used to produce paint colors throughout the theoretical color space. Moreover, for each paint color created, it is possible to determine the ratio of constituent components therein, i.e., the relative amounts of neutral colorant, other colorants, and paint base.

Advantageously, this data may be compiled and used at a retail site to prepare paints of a desired color upon request. This aspect of the invention is described in further detail below.

According to a method of the present invention, the neutral colorant may be added to a paint to advantageously reduce the paint's chroma without appreciably varying the paint's hue or value. Initially, a source paint is selected, wherein it is desired to produce one or more paints having hue and value substantially equal to, and chroma less than, the hue, value, and chroma, respectively, of the source paint. The source paint comprises a mixture of a paint base with one or more of a set of "prime colorants," i.e., various colorants other than the neutral colorant. Such prime colorants may comprise combinations of various pigments other than those comprising the neutral colorant. A volume of the neutral colorant is then added to a paint base of the same type as the paint base of the selected source paint, to form a "neutral paint." The volume of neutral colorant is controlled so that the value (lightness) of the neutral paint is matched to the value of the source paint. In general, the addition of a relatively small amount of neutral colorant to the paint base results in a relatively high value (light) neutral paint color. The value of the neutral paint color decreases (becomes darker) as more neutral colorant is added. Preferably, the neutral colorant is blended with the paint base in small increments until the value of the neutral paint color is matched to the value of the source paint color. The values of the source paint and neutral paint may be measured, and hence may be matched, by using a spectrophotometer, a device which is capable of scanning a color and determining its color coordinates, such as its hue, value, and chroma or its CIELAB coordinates. One type of spectrophotometer is a SpectroEye™, manufactured by Gretag Macbeth of New Windsor, N.Y., which provides D65 CIELAB coordinates of a scanned color.

Once the value of the neutral paint color is matched to that of the source paint color, a volume of the neutral paint may be added to a volume of the source paint to create a paint having a lower chroma than that of the source paint, but substantially the same hue and value. The chroma of the created paint will continue to decrease as more of the neutral colorant is added. This is because the achromatic neutral colorant tends pull the color toward the value axis 20 (FIG. 1). Also, the degree of chroma reduction can be increased by starting with a lower initial volume of the source paint. In this manner, the addition of the neutral colorant to highly chromatic paints facilitates the development of paint colors throughout color space.

Alternatively, the above-described neutral colorant may be blended directly with the source paint. In other words, the step of preparing a neutral paint may be skipped. In this case, the resultantly created paint will have substantially the same hue as the source paint, but a lower chroma and, probably, a different value. The value of the paint will change if, as will often be the case, the value of the neutral colorant itself is different than that of the source paint. Unlike the process described above, in this case the neutral colorant is not first blended with a base and matched to the value of the source paint prior to being added thereto. The difference in value between the neutral colorant and the source paint will cause the value of the paint to shift. On the other hand, if the value of the neutral colorant itself is equal to that of the particular source paint, then there is unlikely to be any value shift.

Figure 6:
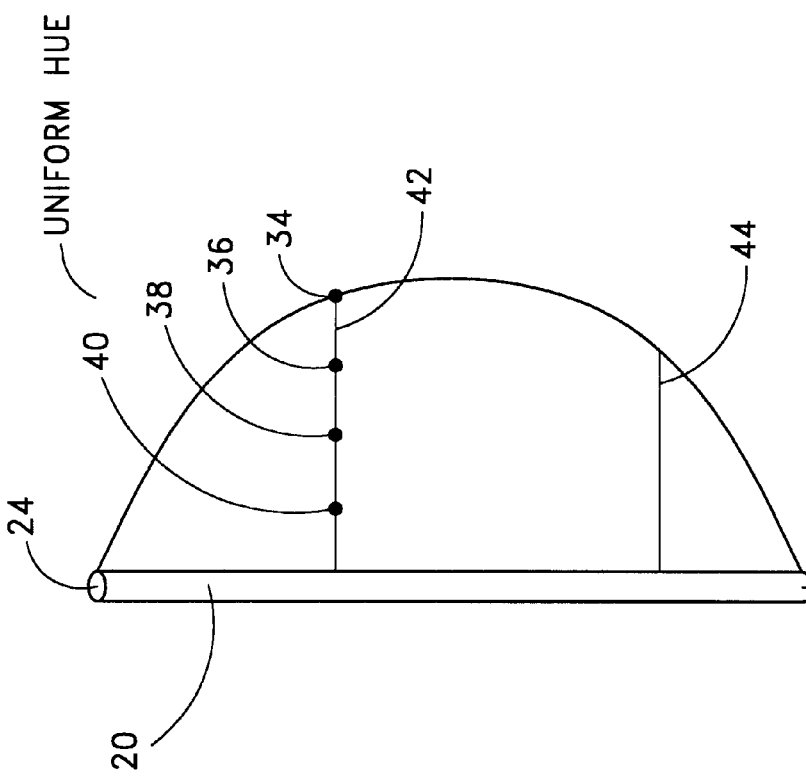
FIG. 6 is a uniform hue plane of the theoretical color space of FIG. 1, illustrating the chroma-shifting effect of adding the neutral paint colorant of the present invention to a paint.
Figure 5:
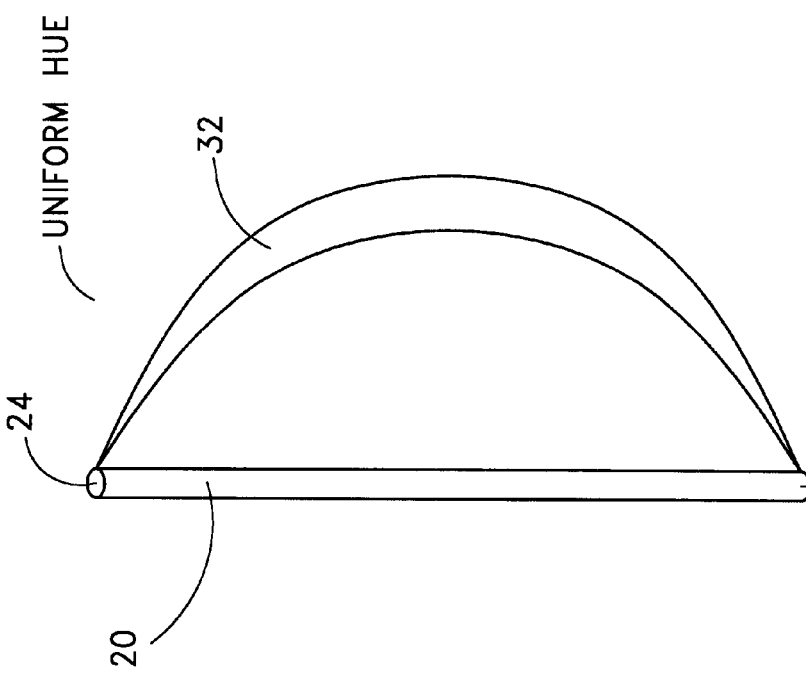
FIG. 5 is a uniform hue plane of the theoretical color space of FIG. 1, illustrating the most chromatic colors across the entire value range.

FIGS. 5 and 6 illustrate the use of the neutral colorant. These figures both show a uniform hue plane of the theoretical color space described above. In FIG. 5, the outer radial portion of the uniform hue plane is indicated by section 32, which represents the more chromatic colors for the entire value range of the shown uniform hue plane. Paint colors within section 32 are generally formed by adding prime colorants to paint bases. Referring to FIG. 6, a point 34 represents the color of a highly chromatic source paint. A volume of neutral paint may be added to the source paint. It is understood that the neutral paint contains a mixture of the neutral colorant with the same type of paint base as in the source paint, such that the neutral paint has a matching value as described above. It is further understood that a set of paints having a uniform value, such as the paints represented by line 42, can be and are preferably formed from the same type of paint base. The addition of a volume of neutral paint to the paint represented by point 34 causes the color to shift along line 42 to point 36. Point 36 represents a paint color having substantially the same hue and value as the paint color of point 34. However, the paint color of point 36 is somewhat less chromatic. If an additional amount of the neutral paint is added to the paint represented by point 36, the color shifts further along line 42 to point 38. Point 38 represents a paint color having substantially the same hue and value as the paint colors of points 34 and 36. However, the paint color of point 38 is somewhat less chromatic than that of point 36. Similarly, the addition of more of the neutral paint shifts the color further along line 42 to point 40. The neutral paint may be added to highly chromatic colors of various hues and values throughout the color space.

In this manner, the color space can be filled in from the most chromatic colors inward to the value axis 20. Note that this process may alternatively begin with a paint color which is not highly chromatic, i.e., not within section 32 of FIG. 5.

As mentioned above, for each paint color created in the above-described manner, such as the paint colors represented by the points 36, 38, and 40 in FIG. 6, the component ratios thereof (ratios of the various paint colorants, including the neutral paint colorant of the present invention, to the paint base) can readily be determined. For example, suppose the process begins with one gallon of Paint A, which is known to contain six ounces of Prime Colorant X mixed with Base Y. Suppose that the neutral colorant of the present invention is mixed with a volume of Base Y to develop a "neutral paint" having the same value as Paint A. Suppose further that one gallon of the neutral paint contains four ounces of the neutral colorant. If one gallon of Paint A is blended with one gallon of the neutral paint, there is formed two gallons of paint whose color has a lower chroma than that of Paint A. This product paint is referred to herein as Paint B. Two gallons of Paint B contains six ounces of Prime Colorant X and four ounces of the neutral colorant. Thus, the component ratios of Paint B can be easily determined. One gallon of Paint B comprises three ounces of Prime Colorant X, two ounces of the neutral colorant, and the remainder Base Y.

In this manner, the component ratios may be determined for all of the paint colors within the color space. In fact, the present inventors have created a database of about 50,000 architectural paint colors spanning the known color space, for each of which paint colors the component ratios are known. Advantageously, a desired quantity of a paint having a selected paint color can easily be produced for a customer at a retail site from the component ratios of that particular paint color. Accordingly, the paint colors in the database may be displayed at a retail site to customers. The component ratios for all the paints in the database can be stored on a storage medium, such as a lookup table on a computer memory. Once a customer decides to purchase a selected paint from the database, the component ratios for the selected paint color may be read from the storage medium. An in-store system may be automated to produce the desired quantity of paint having the selected paint color, or the system may alternatively be configured to send the component ratios thereof to a paint technician to produce the desired paint.

Advantageously, the neutral colorant of the present invention makes it easier to more accurately produce, at a retail site, a relatively small quantity of paint having a desired paint color, as compared to prior art methods. This is due to the fact that the neutral colorant comprises a mixture of pre-blended pigments with a grinding liquid. In particular, these pigments are pre-blended in precisely the necessary ratios to have the property that the neutral colorant may be added to a paint without substantially changing the paint's hue. These pigments are not processed as separate paint colorants to be mixed at the retail site, as in the prior art. Further, the neutral colorant advantageously avoids the problems associated with the "one-drop" limitation described earlier. This is because any amount of drops of the neutral colorant may be added to a paint without substantially changing the paint's hue.

As mentioned above, the neutral paint has the desired property of decreasing the chroma of a source paint to which the neutral paint is added without appreciably varying the source paint's hue or value. Also, the neutral paint is formed by blending the neutral colorant of the invention with an available paint base. With regard to the specifically mentioned embodiment of the neutral colorant, comprising 6.3%–7.7% Color Index Pigment Yellow 42, 2.16%–2.64% Color Index Pigment Red 101, and 3.6%–4.4% Color Index Pigment Black 7, optimum results have been found by combining the neutral colorant with white or tint bases, pastel bases, and midtone bases. However, the combination of this particular neutral colorant with clear or deep bases or with bases having a large proportion of machine-tinted colorants has been found to result in a brown color which is unsuitable for the goal of decreasing chroma without appreciably varying hue or value. In general, this embodiment of the neutral colorant is more effective in bases having greater amounts of titanium dioxide ($TiO_2$), due to the fact that $TiO_2$ has a light-scattering effect.

The neutral paint colorant formed as described above is generally more effective for lighter (higher value) paint colors, i.e., the upper half of the theoretical color space. In darker (lower value) regions of the color space, the paint is less sensitive to the addition of the neutral colorant, requiring greater amounts of the neutral colorant to be added to reduce the paint's chroma. Also, in the darker portion of the color space, the neutral paint undesirably tends to turn brown. It has been found that, in the darker regions of color space, the chroma of paint can be more easily and effectively decreased, without appreciably varying the paint's hue or value, by simply adding black paints having appropriate values (lightness levels). FIG. 6 illustrates this concept. Line 44 represents a uniform value within the darker region of the hue plane. Consider a paint color on line 44. The hue of this paint color may be decreased, i.e., shifted to the left along line 44, by adding a black paint, the black paint having the same value (lightness) as the colors represented by line 44. The black paint comprises a black colorant blended with the same type of paint base as the paints represented by line 44.

The neutral colorant of the invention has been found to be effective throughout virtually all of the upper half of the color space, within a value range of 40–95. At the lower end of the value range, the neutral colorant is especially effective at values above 50, more effective at values above 52, and even more effective at values above 55. At the upper end of the value range, the neutral colorant is especially effective at values below 94. In certain regions, however, addition of the neutral colorant has been found not to produce the desired effect. In particular, in the less chromatic portions of the yellow-green and green-blue hues, the addition of neutral colorant has been found to result in an undesirable hue shift. In particular, in these narrow regions of the color space the addition of the neutral colorant causes the paint to turn brown. To compensate, the color can be modified to regain its intended perceptual appearance by adding some blue-shade black colorant to the produced paint. Also, in the more chromatic portions of the yellow hues, the addition of the neutral colorant has been found to turn the paint green. To compensate, the color can be modified to regain its intended perceptual appearance by adding yellow-oxide colorant to the paint.

Those skilled in the art will readily appreciate from the teachings herein that a neutral colorant can be created that, when added to a paint, modifies one of the hue, value, and chroma of the paint while maintaining one or both of the other two of such color attributes substantially constant. For example, a neutral colorant can be created that, when added to a paint, modifies the paint's value while maintaining the paint's hue and chroma substantially constant. Or, for example, a neutral colorant can be created that, when added to a paint, modifies the paint's hue while maintaining the paint's value and chroma substantially constant.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A paint colorant comprising:
    6.3% to 7.7% Color Index Pigment Yellow 42;
    2.16% to 2.64% Color Index Pigment Red 101; and
    3.6% to 4.4% Color Index Pigment Black 7.

2. The colorant of claim 1, comprising:
    7.0% Color Index Pigment Yellow 42;
    2.4% Color Index Pigment Red 101; and
    4.0% Color Index Pigment Black 7.

3. A method of producing a neutral paint colorant, comprising the steps of:
    blending Color Index Pigment Yellow 42, Color Index Pigment Red 101, and Color Index Pigment Black 7 together to form a pigment mixture; and
    blending said pigment mixture into a grinding liquid to form a paint colorant;
    wherein said paint colorant has a composition of 6.3%–7.7% Color Index Pigment Yellow 42, 2.16%–2.64% Color Index Pigment Red 101, and 3.6%–4.4% Color Index Pigment Black 7.

4. The method of claim 3, wherein said paint colorant has a composition of 7.0% Color Index Pigment Yellow 42, 2.4% Color Index Pigment Red 101, and 4.0% Color Index Pigment Black 7.

* * * * *